United States Patent [19]
Snape

[11] 3,854,612
[45] Dec. 17, 1974

[54] CONTAINER DISCHARGE SYSTEMS

[75] Inventor: George W. Snape, Shipston-on-Stour, England

[73] Assignee: Bulk Unit Load Systems Limited, Warwickshire, England

[22] Filed: May 11, 1973

[21] Appl. No.: 359,479

Related U.S. Application Data
[62] Division of Ser. No. 210,940, Dec. 22, 1971, abandoned.

[30] Foreign Application Priority Data
Dec. 28, 1970 Great Britain.................... 61380/70
Feb. 23, 1971 Great Britain...................... 5234/71
Mar. 30, 1971 Great Britain...................... 8181/71

[52] U.S. Cl. ....... 214/308, 198/220 A, 198/220 DB, 222/196, 222/198
[51] Int. Cl. ......................................... B65g 67/40
[58] Field of Search ............ 214/308; 222/196, 198, 222/185, 1; 198/220 DB, 220 A

[56] References Cited
UNITED STATES PATENTS
| | | | |
|---|---|---|---|
| 3,053,380 | 9/1962 | Spurlin | 198/220 DB |
| 3,467,363 | 9/1969 | Reichel | 222/196 |
| 3,731,828 | 5/1973 | Clarke et al. | 214/308 |

FOREIGN PATENTS OR APPLICATIONS
| | | | |
|---|---|---|---|
| 828,219 | 2/1960 | Great Britain | 198/220 DB |
| 305,838 | 11/1968 | Sweden | 214/308 |

Primary Examiner—Robert J. Spar
Assistant Examiner—Lawrence J. Oresky
Attorney, Agent, or Firm—Bacon & Thomas

[57] ABSTRACT

A bulk container discharge system has a vibratory support frame to support a container. This frame can be vibrated by rotatable out of balance weights arranged to give different strengths of vibrations and/or vibrations in different directions depending on the amount of material in the container. Generally the less material in the container the weaker the vibrations need to be.

10 Claims, 12 Drawing Figures

CONTAINER DISCHARGE SYSTEMS

This is a Division of application Ser. No. 210,940, filed Dec. 22, 1971, now abandoned.

BACKGROUND OF THE INVENTION

The invention relates to the discharge of bulk containers.

It has been found possible to discharge bulk containers by applying vibrations to the container by way of a vibratory mount upon which the container rests. If a strong enough vibration is applied to move the material when the container is full, then this vibration will be more than adequate when the container is partially empty. Indeed through applying strong vibrations to a nearly empty container resonance can be obtained which generates a great deal of highly undesirable noise.

SUMMARY OF THE INVENTION

The invention provides a method of discharging a bulk container comprising the steps of supporting a container on a vibratory support frame, applying a forced vibration to the vibratory support frame to vibrate the container, and varying the strengths and/or directions of the vibrations depending upon the amount of material in the container.

Preferably forced vibrations of at least two different strengths are applied consecutively, becoming weaker as the amount of material decreases.

Preferably two vibration inducing means are operated concurrently when a maximum amount of material is carried in the container.

More specifically a further vibration inducing means is operated at a different time from the aforesaid two means, to vibrate the support frame.

Preferably the strongest of the induced vibrations are applied at an angle of approximately 45° to the vertical.

Preferably at least one of the vibration inducing means is applied about an axis rotatable from 60° to the horizontal, so that it may throw material off the container walls.

The invention also provides a bulk container discharge apparatus comprising a vibratory support frame having means to support a container, and on which there is means to vibrate the container when placed thereon by the application to the vibratory support frame of forced vibrations of different strengths and/or directions, depending upon the amount of material in the container.

Preferably two vibration inducing means comprise out of balance rotational elements which operate concurrently when a maximum amount of material is carried.

More specifically there is further vibration inducing means in the form of a discrete out of balance rotational element operating at a different time from the aforesaid two elements.

Preferably there is a vertically deflectable mounting between the vibratory support frame and a container to be supported thereby, and a proximity switch arranged to alter the strength of the applied vibration when the amount of material is reduced beyond a certain level.

Preferably there is safety means in the form of a cut out switch, which can be brought into operation as a result of prolonged running of the vibration inducing means at a maximum strength.

Preferably the strongest of the vibration inducing means are mounted on the vibratory support frame at an angle of approximately 45° to the vertical.

Preferably at least one of the weaker vibration inducing means is dispersed with its axis rotatable from 60° to the horizontal, so that it may throw material off the container walls.

The invention includes the apparatus described above in combination with a container which has a generally square plan form, and has a discharge opening at its base on rectangular plan form, the walls of the container adjacent its base being inclined at different angles to the horizontal depending on whether they lie on the long or shorter side of the rectangle.

Preferably there is means for remotely operating a discharge trap for the discharge opening.

More specifically the lower edge of a discharge opening has a downwardly extending flange surrounding it, for engagement with a corresponding flange on a vessel to be supplied with material from a container.

The vibratory device may comprise two out of bounds weights, one of which is capable of being fixed rigidly to a rotatable shaft, and the other of which is rotatable at said shaft, which weights have two pairs of corresponding abutments disposed so that when the shaft is rotated in different directions, the weights take up configurations giving different combined effects.

Preferably the abutments are formed of a single axial projection on one weight, which is arranged to engage radial faces on the other weight, on different sides of the projection depending upon the direction in which the shaft is rotated, and in which the projection is movable to different positions on the one weight so that the degree of variation of out of balance on shaft reversal is variable.

PREFERRED EMBODIMENTS

Figure 1:
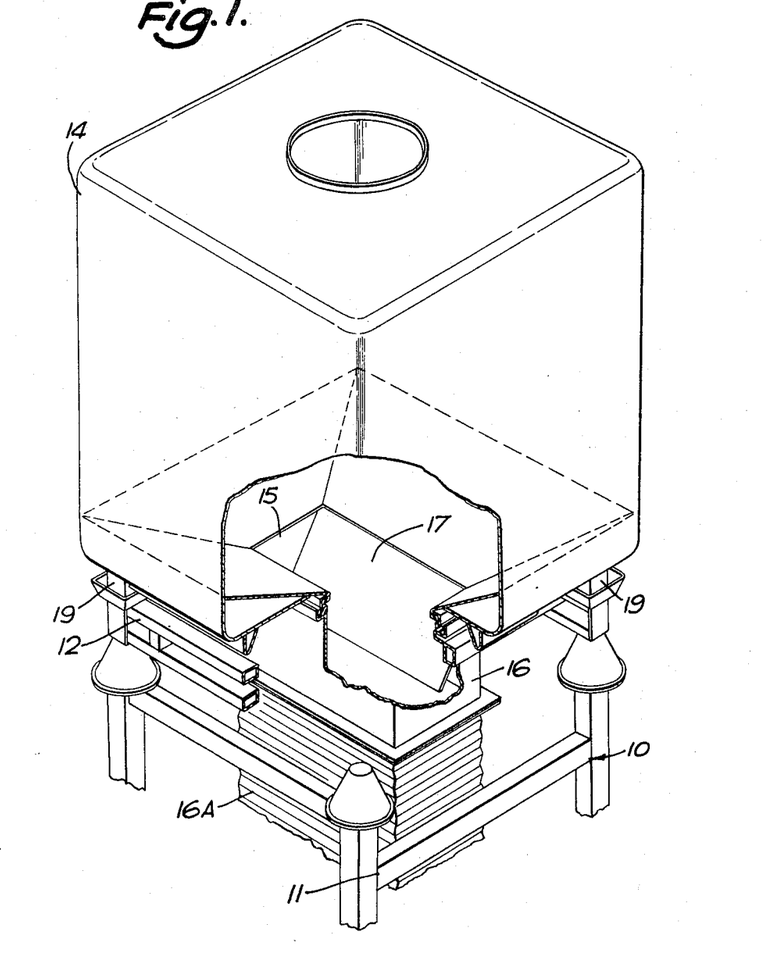
FIG. 1 is a diagrammatic view of a container installed on a frame.

As shown in FIG. 1, a base 10 for a discharge system comprises a fixed frame 11 and a vibratory frame 12. A container 14, having a central discharge opening 15 at its base, is supported on the vibratory frame 12 by means of leg 19. A discharge duct 16a leads away from the base of the discharge unit.

The opening 15 is closable by a trap 17 which opens downwardly into a casement 16. The trap 17 may be operable manually by means of removable operating handles 18 shown in FIG. 7.

Figure 2:
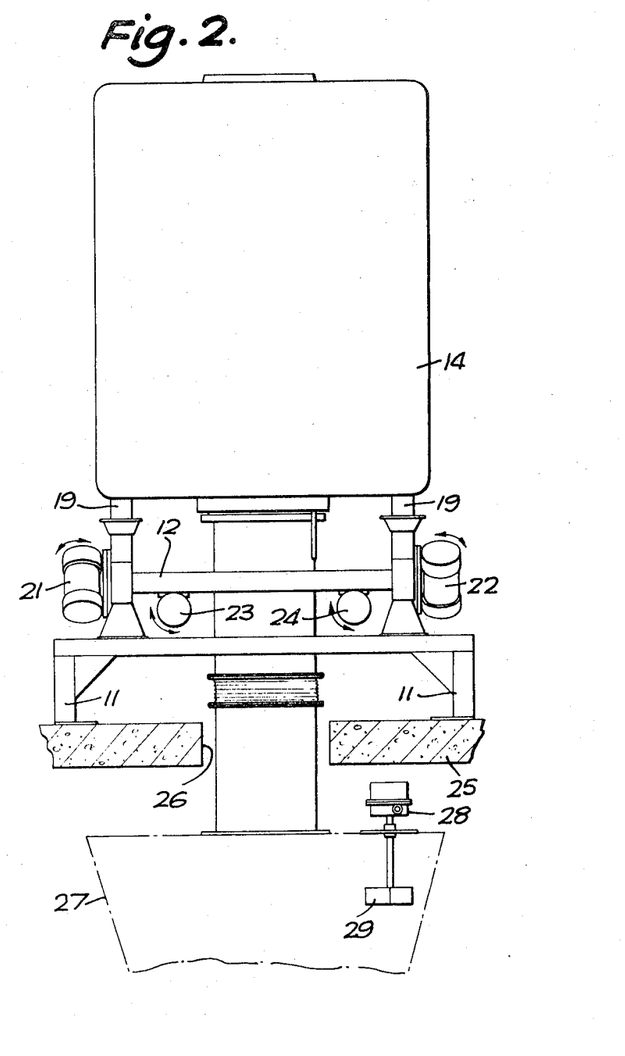
FIG. 2 is a side view of a container installed on a frame, and showing a first embodiment of the invention.
Figure 3:
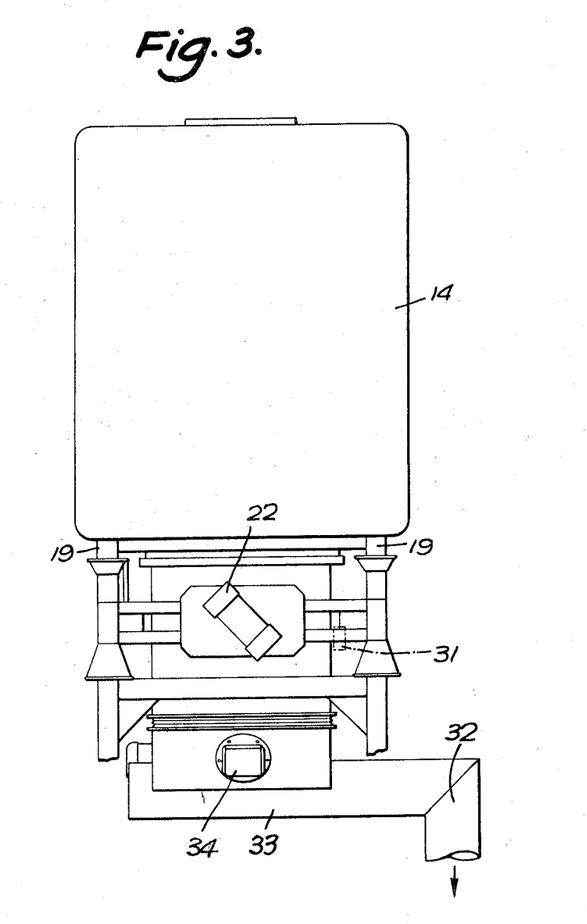
FIG. 3 is a view of the arrows A—A shown in FIG. 2, and illustrating a further embodiment of the invention.

FIGS. 2 and 3, in which like reference numerals have been used to designate like parts, show two different operating configurations for the discharge system.

In FIG. 2 the vibratory frame 12 has attached thereto four electric motors each of which is arranged to rotate an out of balance rotatable element whereby to apply a forced vibration to that frame. Two large electric motors 21 and 22 are attached to the outside of the frame, and are arranged with their axles at 45° to the vertical, and at right angles to each other, in vertical planes adjacent the exterior surfaces of the container. Additionally two small electric motors 23 and 24 are underslung from the frame 12, and (as shown) have their axes horizontal, and parallel to each other. These motors are operable concurrently or consecutively in a manner which will be hereinafter described. The axes of the motors 23 and 24 may be tilted up to 60°.

As may be seen particularly from FIG. 2 the fixed frame 11 is resting on a concrete floor 25, through which there is an opening 26 arranged to receive a chute 27 which leads from the part 16a to a process hopper positioned on a floor below. The process hopper is shown in chain dotted lines and is here designated as 27. At the top of the process hopper there is a level switch 28 having a feeler member 29 extending downwardly into the hopper.

In use the container 14 rests on the vibratory frame 9. Polyurethane may be positioned between the legs 9 of the container and the stand to reduce noise generated between the metal surface of the legs and the stand. Assuming that the container is full of material the motors 21 and 22 are used together to initiate vibration and to discharge the top 60 to 80 percent of the container. When this is completed the high capacity motors may be switched off and the lower capacity motors 23 and 24 may be brought into operation to empty the remainder of the container. As the material is now piled at the sloping side walls of the container the low capacity motors may run alternatively to dislodge material from the side at which they are applied.

The level switch 28 in the process hopper is designed to shut off the discharge unit should the hopper become full. All the above operations of the motor have assumed that there was a switch to sequence the motors into operation.

Turning now to FIG. 3, which relies on meter discharge rather than gravity discharge, it will be seen that there is an adjustable proximity switch 31 between the vibratory frame 12 and the fixed frame 11. The mounting of the vibratory frame on the fixed frame is effected by means of elastomeric material which permits variation of the vertical spacing between the frames depending upon the weight of material in the container. The proximity switch 31 is arranged to detect this variation, and to work the motor sequence accordingly. Clearly when the container is first put on the frame it is full and the elastomeric material is deflected to its greatest extent. This configuration brings about the automatic operation of the two high capacity motors 22 and 21. The high capacity motors could then run until the proximity switch sensed the lightning of the container to such an extent that the vibration was becoming excessive. When about 25 percent of the material remained for discharge the high capacity motors would automatically be switched off by the proximity switch and the motors 23 and 24 would then operate alternately until the container was empty.

It will be seen that the arrangement of FIG. 3 has a meter discharge system comprising a discharge tube 32 leading from a screw discharger 33. Above the screw discharger 33 there is a level switch 34 which serves a function similar to the level switch 28 of FIG. 2.

It is an optional feature that there is a further control arrangement whereby in the event of the high capacity motors 21 and 22 running continuously for a set period, then a "failure" alarm will be operated. This arrangement will safeguard against the possible failure of the level switch and the attendant complication of material compaction which might occur if the equipment were run for a long period without discharge taking place.

Figure 4:
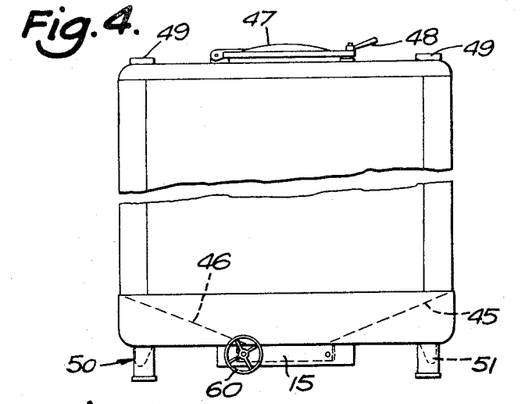
FIGS. 4 and 5 are side and end elevations respectively of a container, both of which are broken away so that they do not show the full height of the container.
Figure 5:
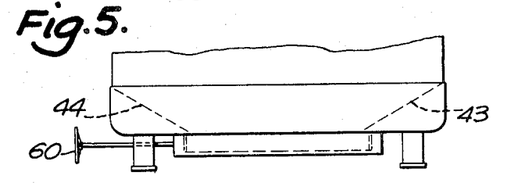
Figure 6:
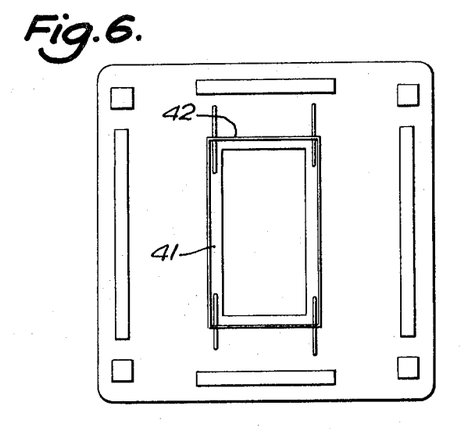
FIG. 6 is a view from below the container shown in FIGS. 4 and 5 looking up at a discharge opening.

As may be seen generally from FIGS. 4 to 6 the discharge opening 15 is of generally rectangular plan form with its longer side 41 generally twice the length of its shorter side 42. It will be appreciated that the walls of the container leading to the discharge opening are angled. In this case the walls leading to the shorter sides (walls 43 and 44) are necessarily angled more steeply than the walls 45 and 46 leading to the shorter sides 42.

The container of this example is intended for use in conjunction with the base 10 shown in FIG. 1. This base includes vibratory means which enable the angles of the walls 43 to 46 to the horizontal to be reduced substantially below more usual values. This reduces the lost volume within the container, since the vibratory motion of the frame 12 will dislodge material that would otherwise have remained on such shallow walls.

The container has a standard lid 47 on its upper surface which is removable or lockable by a handle 48. At the top of the container there may be a stacking fitting 49 for engagement with the feet of a similar container. Alternatively there may be a corner piece 50 having an aperture 51 by which the container may be lifted.

Figure 7:
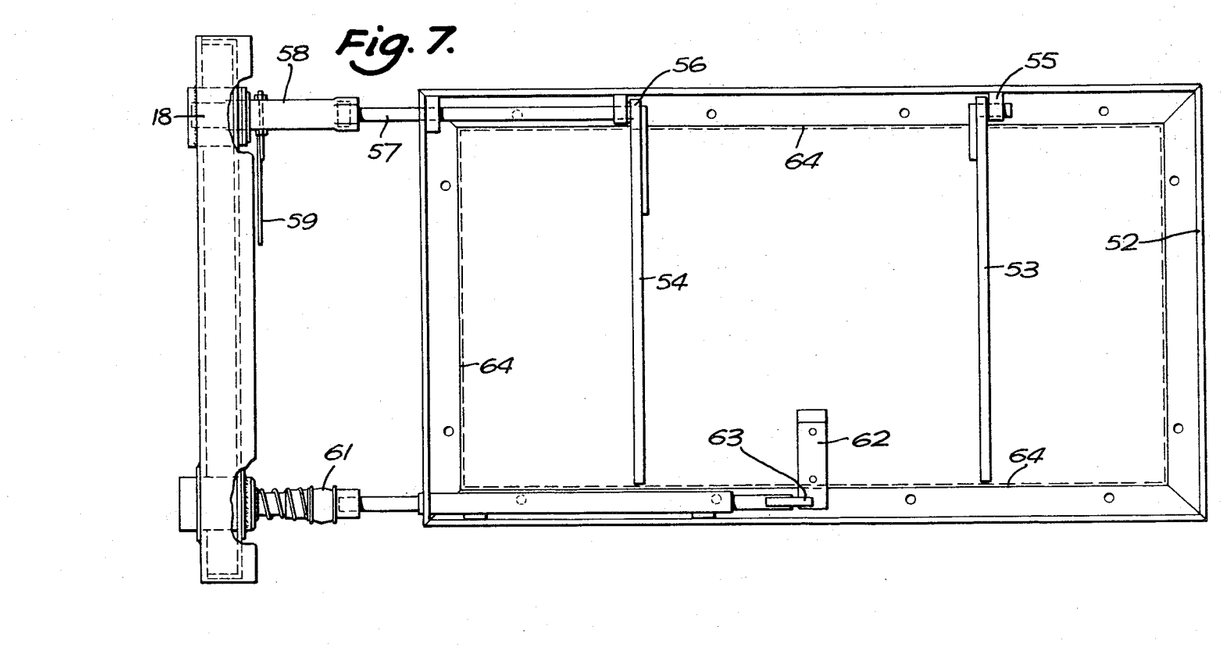
FIG. 7 is a diagram showing a door operation mechanism for the discharge opening of FIG. 6.

The trap 17, as shown in FIG. 7 lies within a flanged frame 52, and is supported by two stiffening members 53 and 54 which extend between the longer sides. The door is hinged to the frame at 55 and 56, and a bar 57 extends from the hinge 56 to a tubular spanner member 58. The member 58 has an indicator attached to it 59 so that the position of the trap 17 may be readily appreciated by an observer outside the container. The tubular spanner 58 is rotatable by a handle 60 shown in position on FIGS. 4 and 5.

The door may be secured in its closed position by means of a worm driven locking assembly 61. There is a latch 62 on the trap 17, which latch is engageable by a bolt 63 which is movable in a direction parallel to the longer side of the trap by the worm assembly 61. There is a gasket 64 surrounding the trap, and engageable with a flange on the frame of the discharge opening.

In operation a full container (14) is attached to the vibratory frame 12 of the base 10, and the trap is opened by means of the handle 60. The frame is then vibrated until the container is empty. It is a feature of the invention that the discharge outlet permits rapid emptying of the container without bridging of material above the opening. When the container is empty the trap 17 may be shut and latched by means of the bolt 63, and the container may be withdrawn to receive another load.

Figure 8:
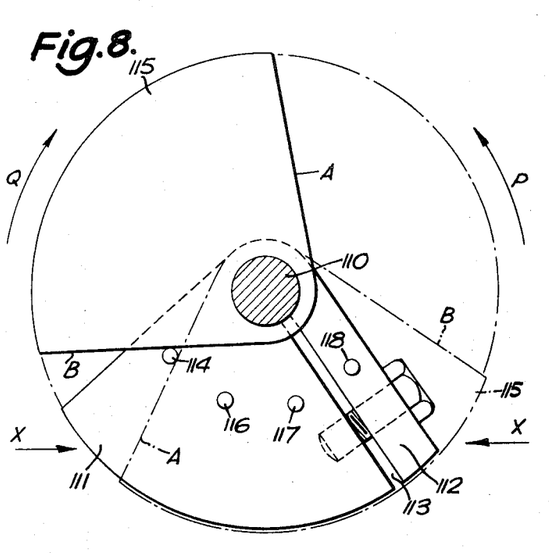
FIG. 8 is an end view of a vibratory device attached to the end of an output shaft of an electric motor.

As shown in FIG. 8 a shaft 110 has a first out of balance weight 111 attached thereto by means of a screw 112 arranged to tighten a slot 113 so that the weight 111 is rigid on the shaft 110. The weight 111 is in the form of a segment of a circle, and has an abutment pin 114 outstanding from one face.

Figure 9:
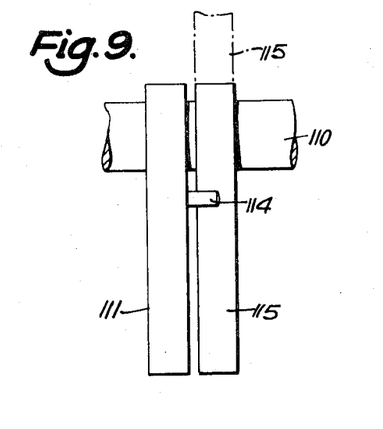
FIG. 9 is a view on the arrow X in FIG. 1.

Rotatable on the shaft 110 there is a second out of balance weight 115, which is adjacent the weight 11. The relative positions of the two weights can be seen in FIG. 9. In FIG. 8 the weight 115 is shown first in dotted lines, and then, in a second position, in ghosted lines. In FIG. 9 the weight 115 is illustrated only in its position shown in dotted lines in FIG. 8. The weight 115 has two generally radial faces here designated A and B. When the shaft 110 and weight 111 are rotated in the direction of the arrow P the pin 114 engages the face A of the weight 115, and drives the two weights around the shaft together with their out of balance components acting in almost the same direction. When the direction of the shaft 110 is reversed and it rotates in the direction of arrow Q, the pin 114 engages the face B of the weight 115, and drives the two weights round together in the other direction.

As may be seen from the FIG. 8 when the weight 115 is in its position shown in ghosted lines the out of balance components of the weights lie at about 120° to one another, and consequently the weights to some extent counteract each other and thus reduce the total out of balance effect derived from the vibratory device.

In this way, by rotation of the shaft 110 in a different direction, the resulting vibratory force produced by the device can be arranged to have a maximum value and a somewhat lesser value. In FIG. 8 there are shown three pin holes 116, 117, 118 with the aid of which three other magnitudes of out of balance forces can be obtained using the same two weights. However to adjust the position of the pin it will be necessary to stop the motors completely and to refit the pin 114 in its new position.

Figures 10, 11, 12:
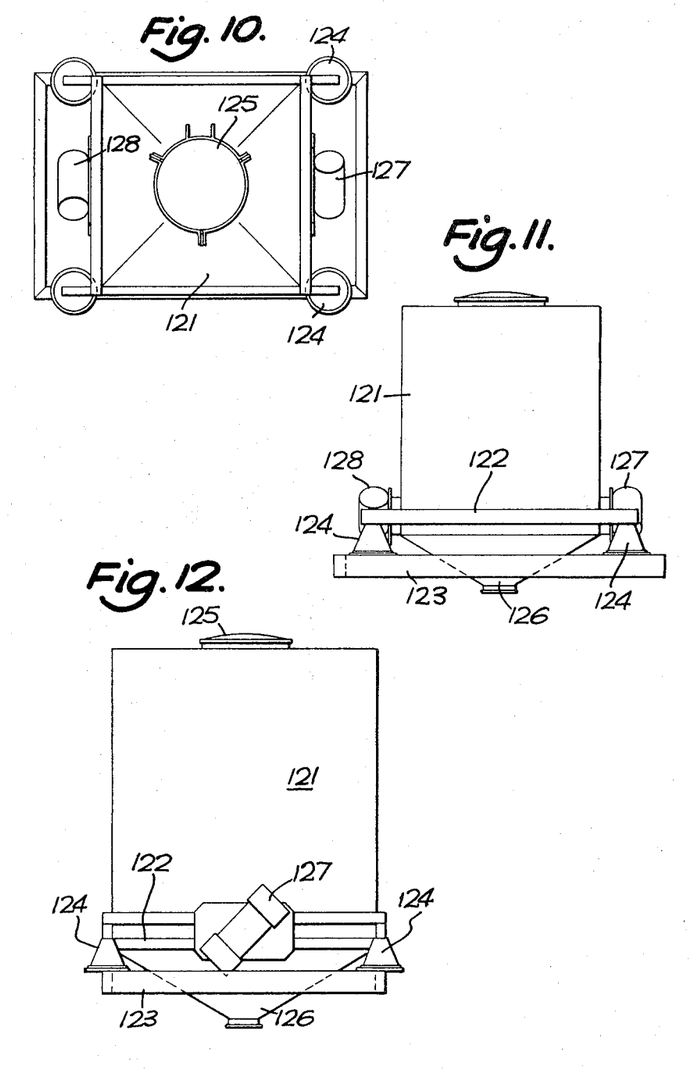
FIG. 10 is a plan view of a flow hopper showing two motors attached thereto.
FIG. 11 is a side view of the hopper shown in FIG. 3.
FIG. 12 is a side view of another hopper in a direction at 90° to that shown in FIG. 4.

Some applications of the vibratory device can be seen in FIGS. 10, 11 and 12 which show a flow hopper 121 arranged on a vibratory frame 122 which is connected to a fixed frame 123 by means of isolators 124. The flow hopper has a lid 125 at its top, through which particulate material can be emptied into the hopper. At the base of the hopper there is a standard outlet 126 through which material can be discharged. Due to the binding and arching characteristics of some materials it may be found difficult to empty the hopper, and consequently two motors 127 and 128 are applied to the sides of the vibratory frame 122. The motors are arranged with their axes in a vertical plane, and inclined to the horizontal by angles of about 45°. As may be inferred from FIGS. 10 and 11 the axes of the motors lie at 90° to each other.

FIG. 12 shows a rather larger hopper as seen from an angle of 90° to thy view shown in FIG. 11, in which the side elevation of the motor arrangement can be seen. In FIG. 12 like items are given like reference numerals to those shown in 10 and 11.

When the flow hopper is full it will clearly require a larger degree of vibration to break the arch formed above the outlet 126, than when the hopper is empty. Thus when the hopper is full and shafts 110 (which are attached to the ends of the output shafts of the motors 127 and 128) are rotated in the direction P, so that the out of balance effects of the weights add to each other. When the hopper is nearly empty the direction of rotation of the motors 127 and 128 may be reversed so that the shaft 110 rotates in the direction of the arrow Q, and the weight 115 adopts its position as shown in ghosted lines. This will reduce the amplitude of vibration to the degree necessary to prevent resonance of the hopper.

The provision of two stage vibration allows the material to be compacted when a container is filled using low strength vibrations, without fear that the material might prove hard to remove due to arching. This is because higher strength vibrations can be used to break the arch when unloading.

I claim:

1. A bulk container discharge apparatus comprising a vibratory support frame having means to support a container, and on which there is a vibratory device to vibrate the container when placed thereon by the application to the vibratory support frame of forced vibrations of different characteristics, depending upon the amount of material in the container, in which the vibratory device comprises two out of balance weights, one of which is capable of being fixed rigidly to a rotatable shaft, and the other of which is mounted on and is rotatable relative to said shaft, which weights have two pairs of corresponding abutments disposed so that when the shaft is rotated in different directions, the weights take up configurations giving different combined effects.

2. An apparatus as claimed in claim 1 in which there is further vibration inducing means in the form of a discrete out of balance rotational element operating at a different time from the aforesaid two out of balance weights.

3. An apparatus as claimed in claim 1 in which there is a vertically deflectable mounting between the vibratory support frame and a container to be supported thereby, and a proximity switch arranged to alter the strength of the applied vibration when the amount of material is reduced beyond a certain level.

4. An apparatus as claimed in claim 1 in which there is safety means in the form of a cut out switch, which can be brought into operation as a result of prolonged running of the vibratory device at a maximum strength.

5. An apparatus as claimed in claim 1 in which at least the one vibratory device is mounted on the vibratory support frame at an angle of approximately 45° to the vertical.

6. An apparatus as claimed in claim 1 in which at least one vibratory device is disposed with its axis rotatable from 60° to the horizontal.

7. An apparatus as claimed in claim 1 in which the abutments are formed of a single axial projection on one weight, which is arranged to engage radial faces on the other weight, on different sides of the projection depending upon the direction in which the shaft is rotated, and in which the projection is movable to different positions on the one weight so that the degree of variation of out of balance on shaft reversal is variable.

8. An apparatus as claimed in claim 1 in combination with a container which has a generally square plan form, and has a discharge opening at its base on rectangular plan form, the walls of the container adjacent its base being inclined at different angles to the horizontal depending on whether they lie on the long or shorter side of the rectangle.

9. An apparatus as claimed in claim 8 in which there is means for remotely operating a discharge trap for the discharge opening.

10. An apparatus as claimed in claim 9 in which the lower edge of a discharge opening has a downwardly extending flange surrounding it, for engagement with a corresponding flange on a vessel to be supplied with material from a container.

* * * * *